United States Patent [19]

Inoue

[11] Patent Number: 4,507,532
[45] Date of Patent: Mar. 26, 1985

[54] WIRE-CUT ELECTRIC DISCHARGE MACHINE

[75] Inventor: Kiyoshi Inoue, Tokyo, Japan

[73] Assignee: Inoue-Japax Research Incorporated, Yokohamashi, Japan

[21] Appl. No.: 495,498

[22] Filed: May 17, 1983

[30] Foreign Application Priority Data

| May 18, 1982 | [JP] | Japan | 57-82469 |
| Aug. 9, 1982 | [JP] | Japan | 57-138230 |
| Feb. 22, 1983 | [JP] | Japan | 58-28984 |

[51] Int. Cl.³ .................................................. B23P 1/08
[52] U.S. Cl. .............................. 219/69 W; 219/69 D; 219/69 M
[58] Field of Search ................. 219/69 M, 69 E, 69 D, 219/69 W, 69 R

[56] References Cited

U.S. PATENT DOCUMENTS

| 4,232,208 | 11/1980 | Buhler | 219/69 W |
| 4,317,019 | 2/1982 | Itoh | 219/69 D |

FOREIGN PATENT DOCUMENTS

| 47-20797 | 11/1972 | Japan . |
| 50-54538 | 5/1975 | Japan . |
| 50-95894 | 7/1975 | Japan . |
| 53-84296 | 7/1978 | Japan . |
| 53-165396 | 12/1978 | Japan . |
| 54-137799 | 10/1979 | Japan . |
| 54-167496 | 11/1979 | Japan . |
| 55-157430 | 12/1980 | Japan . |
| 33237 | 4/1981 | Japan | 219/69 M |
| 114624 | 9/1981 | Japan | 219/69 M |
| 56-134134 | 10/1981 | Japan . |
| 56-157928 | 12/1981 | Japan . |

Primary Examiner—M. H. Paschall
Attorney, Agent, or Firm—Posnack, Roberts, Cohen & Spiecens

[57] ABSTRACT

A wire-cut electric discharge machine having an improved nozzle system for supplying working fluid into a working gap between a workpiece and wire electrode. The improved nozzle system comprises a working fluid nozzle coaxial with the wire electrode and an auxiliary nozzle for producing an intense jet stream in the back portion of the wire electrode, namely, into the slit formed by the spark erosion. The jet stream pressure acts on the semicylindrical surface opposite the front surface at which the discharge pressure is produced to preserve the linearity of the wire electrode.

19 Claims, 17 Drawing Figures

WIRE-CUT ELECTRIC DISCHARGE MACHINE

BACKGROUND OF THE INVENTION

In a wire-cut electric discharge machine, it is necessary to supply a working fluid such as water, kerosene or the like into the working gap between the wire electrode for spark erosion and a workpiece in order to cause the electric discharge therein.

However, the width of this working gap is 0.05 mm or less and the diameter of the wire electrode is 0.2 to 0.3 mm or less, so that it is not easy to supply adequate working fluid into this working gap.

A conventional method is well known wherein a working fluid nozzle is used to produce the working fluid jet stream into the working gap where the spark erosion is presently performed along the wire electrode from the lower side or from both upper and lower sides of the workpiece.

The working fluid nozzle which was used in the early days is separately equipped from the guide device of the wire electrode, thereby causing the jet stream to cross the wire electrode. However, there are problems in that the reaching distance of the jet stream in the working gap is too short to completely fill the working gap by the working fluid and if the depth of the workpiece is 20 to 40 millimeters or more, this may cause the gaseous discharge, so that the spark erosion will be disabled.

To prevent this, a working fluid nozzle has been proposed wherein the wire electrode passes through the center of the opening and the jet stream is produced which overlaps the wire electrode and flows along its surface. This prior art has been disclosed in a Japanese Published Unexamined Patent Application Ser. No. 54538 of 1975.

However, this prior-art working fluid nozzle also has a problem in that the open air is swallowed into the working gap, so that it is impossible to perfectly prevent the occurrence of gaseous discharge. Therefore, a dual coaxial nozzle has been proposed which comprises a high pressure nozzle for producing a high pressure thin jet stream which flows along the surface of the wire electrode while keeping close contact therewith and a low pressure nozzle which is coaxially arranged outside of the high pressure nozzle and which produces a lower pressure jet stream. This dual coaxial nozzle has been disclosed in a Japanese Published Unexamined Utility Model Application Ser. No. 167496 of 1979.

Furthermore, in addition to the above-mentioned two applications, another system has been proposed wherein a workpiece is dipped into the working fluid and the working fluid is also discharge by a nozzle. Such system has been disclosed in a Japanese Published Unexamined Patent Application Ser. No. 20797 of 1972.

The objects of the above-mentioned improved nozzles are to produce a flow of the working fluid along the surface of the wire electrode in the working gap and to prevent the open air from entering the working gap.

Owing to these improvements, a certain sufficient amount of working fluid is supplied into the working gap and the occurrence of gaseous discharge can also be prevented.

However, even these well-known methods have problems in that the wire electrode is deformed into an arch shape due to the discharge pressure generated in the working gap, so that a short circuit may occur between the workpiece and the wire electrode and the work precision may be reduced especially in the places where working direction suddenly changes.

Although such a short circuit can be avoided by reducing the working speed at the turning point in the working direction, this countermeasure will in turn cause an over cut at that portion, namely the working gap will be widened; therefore, there is a problem in that the working precision will be adversely reduced.

SUMMARY OF THE INVENTION

This invention was made to eliminate such problems and intends to provide a wire-cut electric discharge machine in which the above described arch-shaped deformation of the wire electrode is eliminated or decreased to a certain extent using a working fluid jet stream, thereby realizing the spark erosion at high speed while increasing mean working current, and with high accuracy even in portions having large curvatures.

To accomplish the above object, wire-cut electric discharge machine according to the present invention uses the working fluid nozzles which can produce not only the coaxial cylindrical working fluid flow which flows along a surface of wire electrode but also a jet stream which can apply the pressure to the wire electrode in the slit formed at the back portion of the wire electrode.

An advantage is that the linearity of the wire electrode is improved since this fluid pressure sets off the discharge pressure generated on the semicylindrical surface of the wire electrode in the work moving direction.

In an embodiment of the present invention, the working fluid nozzles have single flat openings of streamline shape or the like, or an array of a plurality of circular openings, and are controlled so that the longitudinal center line always faces the work moving direction.

In another embodiment, the working fluid nozzles comprise a main nozzle which is located at the center and through which the wire electrode passes and a group of a number of subnozzles which are symmetrically and radially arranged around the circumference of the main nozzle. The main nozzle provides for a jet stream to always wash the surface of the wire electrode and the subnozzles, are constituted so that only the subnozzles which face the direction opposite to the work moving direction, or seen from the main nozzle produce the jet streams.

In another embodiment, another subnozzle is used to discharge an intense jet stream into the slit formed by the spark erosion, as well as a well-known working fluid nozzle to produce a cylindrical film-like jet stream along the surface of the wire electrode.

Various other objects, advantages and features of the present invention will become readily apparent from the ensuing detailed description of preferred embodiments, taken in conjunction with the accompanying drawings, and the novel features will be particularly pointed out in the appended claims.

BRIEF DESCRIPTION OF THE DRAWINGS

FIGS. 4 to 8 are enlarged front views showing, respectively, the point opening portions in different embodiments of working fluid nozzles which are used in the wire-cut electric discharge machine according to the present invention;

DETAILED DESCRIPTION OF THE PREFERRED EMBODIMENTS

Figure 1:
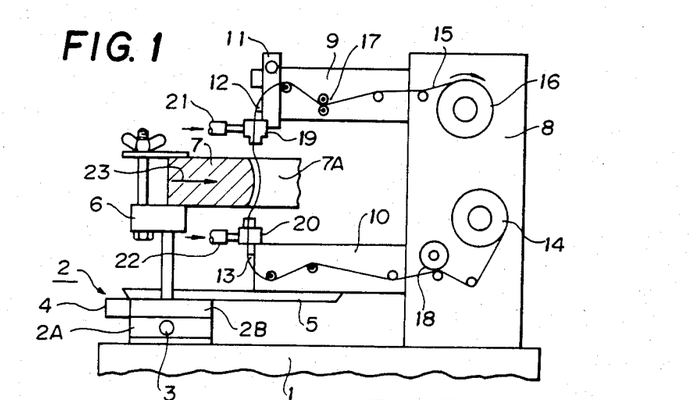
FIG. 1 is a side view, partly broken away in section, showing the principal construction of a well-known prior-art wire-cut electric discharge machine.
Figure 2:
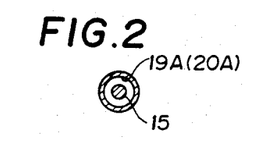
FIG. 2 is an enlarged cross sectional view of a working fluid nozzle which is used in the above-mentioned wire-cut electric discharge machine.
Figure 3:
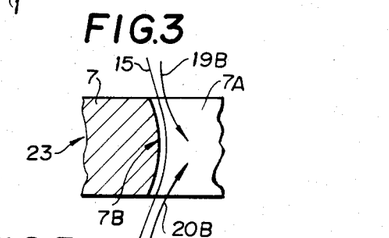
FIG. 3 is an explanatory view showing the arch-shaped deformation state of the wire electrode caused in the above-mentioned wire-cut electric discharge machine.

In FIGS. 1 to 3, reference numeral 1 shows a bed of an electric discharge machine; 2 an X-Y cross table comprising a moving table 2A in the X-axial direction and a moving table 2B in the Y-axial direction; 3 a motor to move the moving table 2A in the X-axial direction; 4 a motor to move the moving table 2B in the Y-axial directions; 5 a working fluid receiving vessel; 6 a working table on which a workpiece 7 attached; 8 a column mounted on one end of the bed 1; 9 and 10 upper and lower arms which are supported by the column 8 respectively; 11 a work head which is elevationally attached to the upper arm 9; 12 and 13 wire electrode guides attached respectively to the work head 11 and the lower arm 10; 14 a storing drum for a wire electrode 15; 16 a winding drum for the wire electrode 15; 17 a wire electrode pulling-out device comprising a capstan and a pinch roller; 18 a braking device comprising a pinch roller and a brake drum for applying tension force by braking the wire electrode 15 pulled out of the storing drum 14; 19 and 20 working fluid nozzles attached respectively to the work head 11 and the lower arm 10; 21 and 22 working fluid supplying tubes respectively to supply the working fluids having predetermined pressures from a working fluid supplying source (not shown) to the working fluid nozzles 19 and 20; 23 an arrow indicating the work moving direction given to the workpiece 7; 7A a slit formed by the spark erosion; and 7B a curve showing the outline of the working surface of the workpiece 7 which was cut in the work moving direction.

The wire electrode guides 12 and 13 are attached respectively to the work head 11 and the lower arm 10 so that the wire electrode 15 stressed therebetween is straight. Similarly, the working fluid nozzles 19 and 20 are attached to the work head 11 and the lower arm 10, respectively, so that the straight portion of the wire electrode 15 passes through the center line of their nozzle openings.

As shown in FIG. 2, the wire electrode 15 passes through the centers of nozzle openings 19A and 20A of these well-known fluid nozzles. The working fluid discharged from the annular openings around the circumference of the wire electrode 15 coaxially overlaps the wire electrode 15, thereby producing a high speed jet stream which flows in a layer-like form along the surface of the wire electrode. This allows the wire electrode 15 at the corresponding portion to cut the workpiece 7 by the spark erosion.

The wire electrode 15 pulled from the storing drum 14 passes through the braking device 18, wire electrode guide 13, working fluid nozzles 20 and 19, and wire electrode guide 12, and is pulled out by the wire electrode pulling-out device 17, then wound around the winding drum 16. Concurrently, a predetermined amount of working fluid is supplied from the working fluid supplying tubes 21 and 22 and discharged. The voltage pulses are applied between the workpiece 7 and the wire electrode 15 from a well-known pulse power supply (not shown). The motors 3 and 4 are driven from a suitable power source in accordance with a numerical controller (not shown). Thereby, the workpiece 7 is cut and worked to a desired shape.

However, at this time, the fluid pressure in the working gap between the workpiece 7 and the wire electrode 15 is higher than in the back portion, namely than the fluid pressure in the slit 7A. The fluid flow discharged out in the working gap is likely to escape toward the slit 7A formed by the spark erosion as shown by streamlines 19B and 20B in FIG. 3. Moreover, the electric discharge caused in the working gap may progressively increase the fluid pressure in the working gap. Therefore, the wire electrode 15 will not be kept straight in the working section between the working fluid nozzles 19 and 20 but deformed to be arch-shaped as shown in FIG. 3. Thus, this results in the disadvantage as described previously.

According to the present invention, greater amount of working fluid is injected forcibly in the slit 7A at the back portion of the wire electrode as compared with the amount of the working fluid injected in the working gap between the workpiece 7 and the wire electrode 15. Hence, a back pressure of a certain extent which can resist the discharge pressure produced in the working gap is produced in the slit 7A. This back pressure acts on the back portion of the wire electrode 15 to restrict the arch-like deformation, to purge air and gases from the working gap and to fill the working gap with working fluid thereby improving the linearity of the wire electrode 15 and increasing working electric current.

Various methods can be proposed a means for excessively supplying the working fluid into the slit 7A.

The first embodiment for that purpose is, as shown in FIGS. 4 to 8, to use the nozzle having a non-circular opening or an opening (openings) which is (are) symmetrical to the direction perpendicular to the work moving direction.

Figure 4:
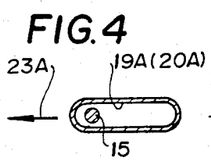

Referring to FIG. 4, it will be seen that a very flat elliptical nozzle opening 19A (20A) is shown. This nozzle is arranged so that the wire electrode 15 passes through one end of the elongated opening. As will be described later, the position of the working fluid nozzle is controlled so that the major axis of the opening always coincides with the work moving direction 23A.

Figure 5:
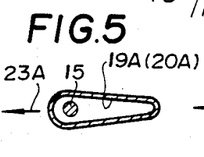

Referring to FIG. 5, there is shown a flat but streamlined nozzle opening 19A (20A) wherein one distal end thereof is narrower than the other end for receiving the wire electrode 15.

Figure 6:
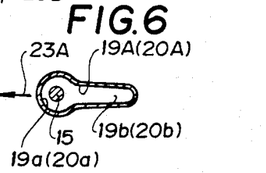

FIG. 6 shows a spoon-like nozzle opening 19A (20A) consisting of a circular head portion 19a (20a) and a relatively thin elongated handle portion 19b (20b). This nozzle opening is arranged such that the wire electrode 15 passes through the center of the head portion and the width of the handle portion is substantially the same as that of the slit to be worked.

Figures 9, 10:
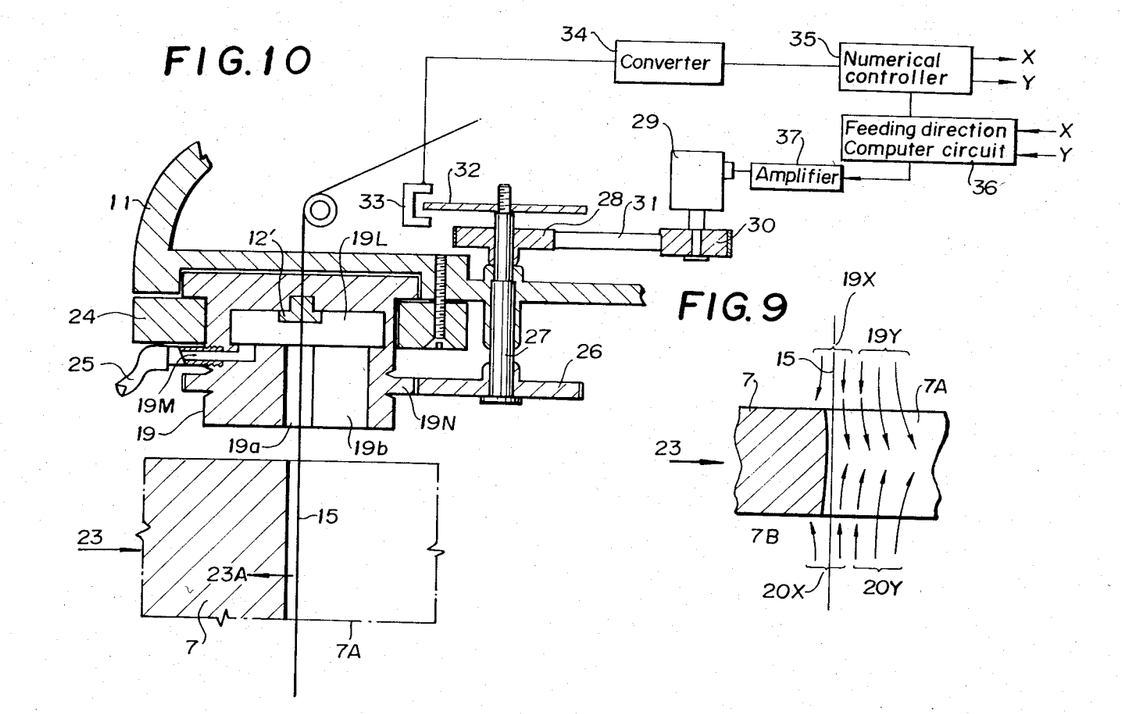
FIG. 9 is an explanatory view showing the wire electrode shape in the wire-cut electric discharge machine according to the present invention.
FIG. 10 is partially enlarged crosssectional view showing the principal portion of an embodiment of the wire-cut electric discharge machine according to the present invention.

Referring to the embodiment shown in FIG. 7, the working fluid nozzle includes a plurality of circular opening 19c (20c) and 19d (20d) of different sizes which are arranged in an array. The wire electrode 15 passes through the center of the largest circular portion. FIG. 8 shows the nozzle openings comprising a plurality of thin tubes 19e (20e) and 19f (20f). In these nozzles shown in FIGS. 7 and 8, the respective diameters of the auxiliary openings 19d (20d) and thin tubes 19f (20f) are set to be smaller than those of the diameters of the opening 19c (20c) and thin tube 19e (20e) through which the wire electrode 15 passes. The three openings 19d (20d) and the three thin tubes 19f (20f) are arranged so that the diameters of the outer ones are gradually smaller than the diameters of the inner ones as they are apart from the wire electrode 15. These working fluid nozzles are adjusted so that their central axes always coincide with the work moving direction 23A. In other words, the thin elongated openings or the auxiliary openings always face the slit caused by the spark erosion by controlling the respective directions of the central axes around the wire electrode 15 by means of, for example, a device shown in FIG. 10. Consequently, as shown in FIG. 9, working fluid flows 19Y (20Y) to be injected into the slit 7A at the back portion of the wire electrode 15 are produced along with working fluid flows 19X (20X) which encircle the wire electrode 15. Thus, the back pressure will act on the wire electrode 15 against the electric discharge pressure, resulting in an improvement of the linearity of the wire electrode 15 in the condition of working fluid flow in the working gap.

Now, the invention will be described with respect to FIG. 10.

In FIG. 10, only the upper working fluid nozzle 19 and a device for controlling the rotation thereof are illustrated. However, the lower working fluid nozzle 20 and a device for controlling the rotation thereof are also installed at to the lower side of the workpiece 7 almost symmetrically to those shown herein.

In FIG. 10, reference numeral 12' represents a die-type electrode guide which is used in place of the wire electrode guide 12 in FIG. 1. The working fluid nozzle 19 is as shown in FIG. 6, and it comprises a working fluid tank 19L, a gear section for rotation 19N, a working fluid supplying port 19M, and nozzle openings 19a and 19b.

Referring again to FIG. 10, reference numeral 24 indicates a holder for holding the working fluid nozzle 19 so as to freely rotate around the wire electrode 15; 25 denotes a flexible tube for supplying the working fluid which is connected to the working fluid supplying port 19M; 26 is a spur gear for engagement with the gear section 19N for rotation; 27 a gear shaft for spur gear 26, 28 an inverter pulley attached to the gear shaft 27; 29 a servo-motor; 30 a main driving pulley attached to the shaft of servo-motor 29; 31 a belt; 32 a cord plate; 33 a pick-up; 34 a converter; 35 a numerical controller; 36 a feeding direction computing circuit; and 37 a servo-amplifier.

The numerical controller 35 serves to give desired two-way work feeding motions in the X-Y directions to the workpiece 7 through a work moving device (not shown) as in a traditional well-known manner, thereby allowing the workpiece 7 to be cut a predetermined shape.

An instruction signal to be given to a work moving motor by the numerical controller 35 and a signal of an encoder for observing the operation of the work moving motor are also input to the feeding direction computing circuit 36. The feeding direction computing circuit 36 calculates the tangential direction of the outline of the portion which is presently being worked, that is, the work moving direction on the basis of its input data. This direction is then compared with the angular information of the working fluid nozzle 19 sent from the converter 34 through the numerical controller 35, thereby rotating the servo-motor 29 through the servo-amplifier 37 so that both of them always coincide.

The rotation of the servo-motor 29 is transmitted to the working fluid nozzle 19 through the main driving pulley 30, belt 31, inverted pulley 28, gear shaft 27, and spur gear 26. The rotational direction of the working fluid nozzle 19 is controlled so that the handle portion 19b of the nozzle opening always overlaps the upper opening of the slit 7A which has been just worked.

In this embodiment, the work moving direction is calculated on the basis of the operating conditions of the work moving motor, whereby the rotational angle of the working fluid nozzle 19 is controlled. However, it may be possible to preliminarily memorize the data about the work moving direction in the numerical control program and to synchronize with the control of the work moving motor, thereby numerically controlling the direction of the working fluid nozzle.

Figure 11:
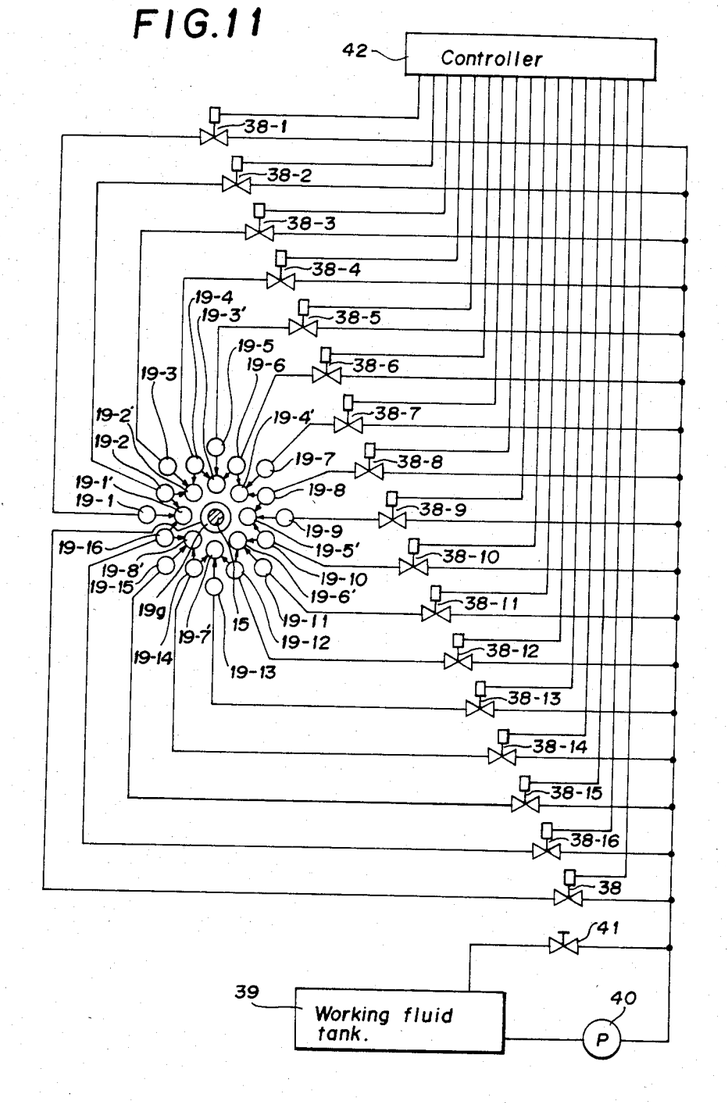
FIG. 11 is an explanatory view showing the principal portion of another embodiment of the wire-cut electric discharge machine according to the present invention.

Next, the embodiment shown in FIG. 11 will be described.

This embodiment uses a stationarily fixed working fluid nozzle. In FIG. 11, the wire electrode 15 passes through an opening 19g of a main nozzle, and reference numerals 19-1, 19-2, 19-3, . . . 19-16, and 19-1', 19-2', . . . 19-8' represent respectively openings of auxiliary nozzles which are arranged radially and symmetrically around the main nozzle 19g; 38, 38-1, 38-2, . . . 38-16 indicate solenoid valves; 39 a working fluid tank; 40 a working fluid pump; 41 a manually operating valve; and 42 a control circuit.

The auxiliary nozzles 19-1, 19-3, 19-5, . . . 19-15 are connected respectively and correspondingly to each of the auxiliary nozzles 19-1', 19-2', . . . 19-8' which are arranged inwardly on the same radius through check valves (not shown). The auxiliary nozzles 19-2, 19-4, 19-6, . . . 19-16 are respectively connected to each two inside nearest auxiliary nozzles 19-1' and 19-2'; 19-2' and 19-3'; 19-3' and 19-4'; . . . ; 19-8' and 19-1' through the check valves. The working fluid may be supplied to the main nozzle 19g and auxiliary nozzles 19-1, 19-2; 19-3, .

.. 19-16 selectively through the solenoid valves 38, 38-1, 38-2, ... 38-16, and the pump 40, respectively.

The solenoid valve 38 is opened during the spark erosion to continuously supply the working fluid into the main nozzle 19g.

The control circuit 42 calculates the work moving direction which is presently being worked in the same manner as described previously, and on the basis of this direction, it opens a corresponding solenoid valve 38-i (i=1, 2, ... or 16) to selectively supply the working fluid into the auxiliary nozzle in the opposite direction by 180° from its work moving direction.

The opening shapes, dimensions, dispositions, and pressures of the fluid to be discharged of these auxiliary nozzles are arranged so that their jet streams are efficiently injected into the slit 7A formed by the spark erosion for producing pressure to act on the back portion of the wire electrode, while the incoming air is completely eliminated, thereby obtaining stable working conditions. For this purpose, a part of the auxiliary nozzles is provided in the opening of the main nozzle.

In this embodiment, the purpose of the present invention can be accomplished without rotating the nozzle itself.

It will be appreciated, in this embodiment, that 72 or more auxiliary nozzles can be disposed on the circumference if necessary and their matrix-like connecting method can be also freely changed. Such a system as described above can be carried out in combination with a system wherein the nozzle itself is rotated.

Next, the embodiment shown in FIGS. 12 to 14 will be described.

In this embodiment, an auxiliary nozzle is used whose position is rotationally controlled around the wire electrode and its elevational angle is controlled in the vertical plane including the wire electrode, whereby its tip is inserted into the slit whose width is slightly larger than the diameter of the auxiliary nozzle.

Figure 12:
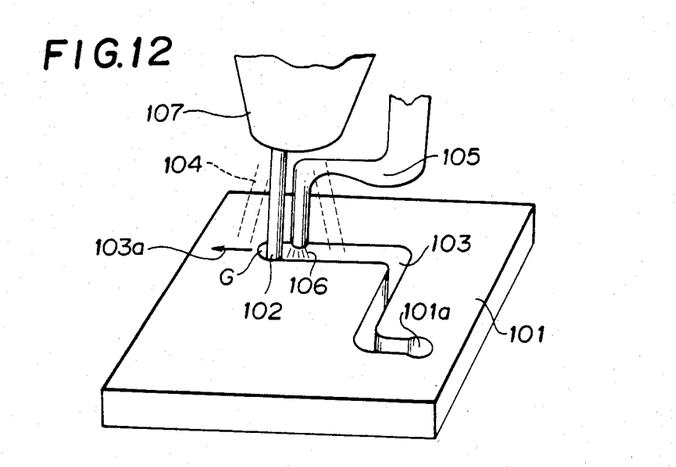
FIG. 12 is a partially enlarged perspective view showing the state of the portion which is presently being worked when it is seen from the lower surface of the workpiece in a further different embodiment of the wire-cut electric discharge machine according to the present invention.
Figure 13:
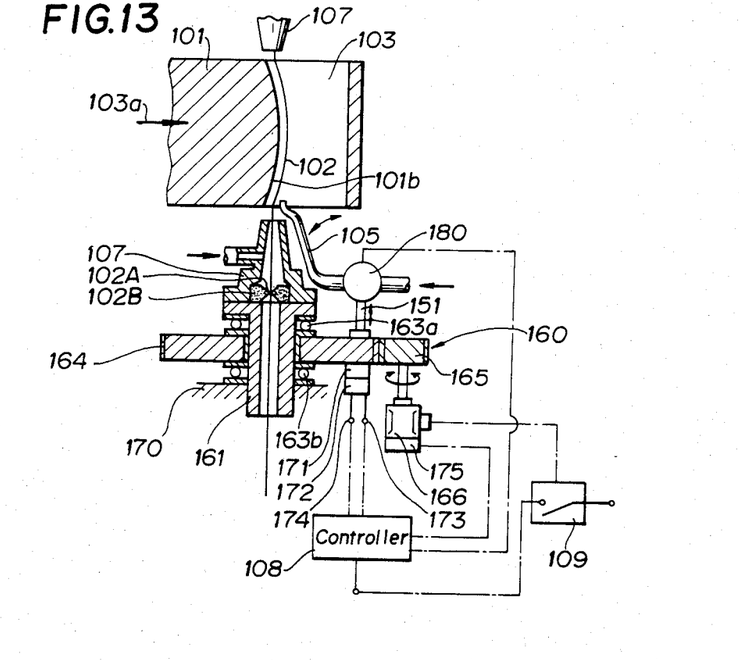
FIG. 13 is a partially enlarged cross sectional view showing the detail of the embodiment shown in FIG. 12.
Figure 14:
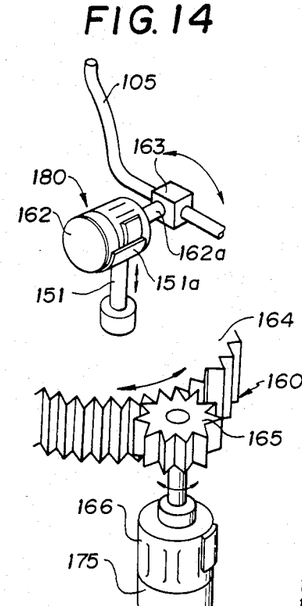
FIG. 14 is a partially enlarged perspective view showing the details of a working fluid nozzle revolving device which is used in the embodiment shown in FIG. 12.

In FIGS. 12 to 14, reference numeral 101 indicates a workpiece; 101a a starting hole in which the wire electrode has been inserted prior to the spark erosion; 102 a wire electrode; 103 a worked slit; 103a is an arrow indicative of the work moving direction; 101b is a working surface; 104 a main working fluid shower; 105 an auxiliary working fluid nozzle; 106 an auxiliary working fluid jet stream; 107 a main nozzle; 102A a die guide through which the wire electrode 102 is inserted and guided; 102B a holder therefore; 108 a controller; 109 a switching mechanism; 151 a supporting shaft of the auxiliary working fluid nozzle 105; and 160 a rotational position controller for the auxiliary working fluid nozzle 105 around the wire electrode 102. The controller 160 comprises a cylindrical supporting member 161 fixed to a lower arm 170 of the electric discharge machine, bearings 163a and 163b, gears 164 and 165, and a motor 166.

Reference numeral 171 represents a vertically reciprocational moving mechanism of the supporting shaft 151 of the auxiliary working fluid nozzle 105; 172 an actuator therefor; 173 and 174 operation switching command input terminals; 175 a rotary encoder; 180 an elevational angle controller of the auxiliary working fluid nozzle 105 comprising a motor 162 fixed to an attaching portion 151a mounted on the upper end of the supporting shaft 151 and a nozzle attaching member 163 attached to its shaft 162a.

The controller 108 makes the rotational position controller 160, vertically reciprocational moving mechanism 171 and elevational angle controller 180 operative in accordance with the thickness of the workpiece 101 and other predetermined working conditions to adjust the position, height and angle of elevation of the supporting shaft 151. Upon starting the spark erosion, the tip of the auxiliary working fluid nozzle 105 is correctly inserted into the worked slit 103 and the working fluid to be discharged from its tip is controlled so that it faces the central point of the working surface 101b in the slit 103, thereby applying pressure of its jet stream to the wire electrode 102.

As the spark erosion advances, the controller 108 rotates the motor 166 in accordance with a predetermined program so that the tip of the auxiliary working fluid nozzle 105 always traces the slit 103 to follow the track of the wire electrode 102.

The opening diameter of the main nozzle 107 is generally set to be always almost the same or slightly larger than the width of the slit 103. The working fluid shower 104 is discharged independently from the work moving direction so that it encircles the wire electrode 102. However, at the immediate back portion of the wire electrode 102, the auxiliary working fluid jet stream 106 having generally a higher pressure than the jet pressure at the main nozzle is produced by the auxiliary working fluid nozzle 105. By this high pressure the arch-like deformation of the wire electrode 102 is corrected.

Figure 15:
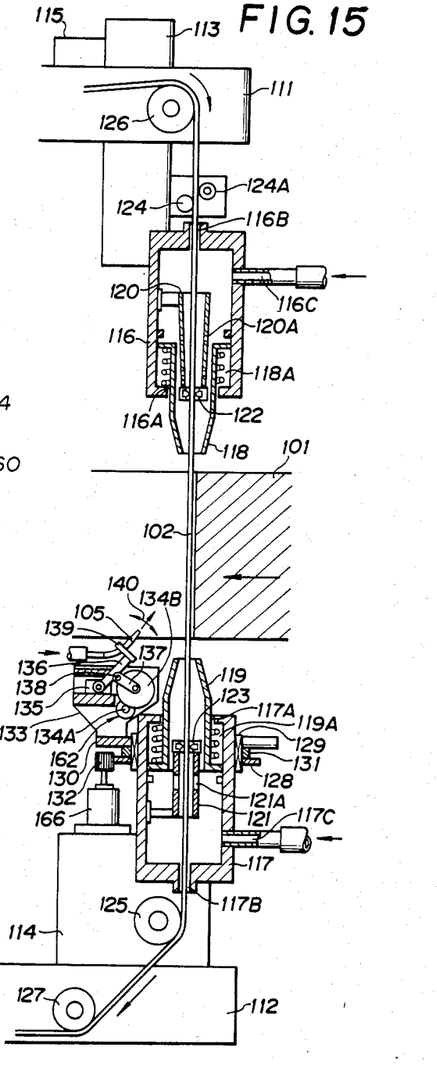
FIG. 15 is a cross sectional view showing the principal portion of another embodiment which is similar to the machine shown in FIG. 13.

Referring now to FIG. 15, another embodiment is illustrated.

In FIG. 15, reference numeral 101 shows a workpiece; 102 is a wire electrode; 111 and 112 upper and lower arms supported by the column of the electric discharge machine; 113 and 114 work heads supported respectively by the arms 111 and 112; 115 an elevational positioning adjustment device of the upper work head 113; 116 and 117 housings for working fluid nozzles which are attached to the work heads 113 and 114. These housings 116 and 117 respectively have openings 116A and 117A through which working fluid nozzles 118 and 119 are slidably inserted, small openings 116B and 117B formed on the opposite sides therefrom, and ports 116C and 117C which are connected to a working fluid supplying tube. Reference numerals 118A and 119A indicate springs; 120 and 121 guide holders which respectively have working fluid flow openings 120A and 121A and which are fixed in the housings 116 and 117 in order to support positioning die guides 122 and 123 through which the wire electrode 102 passes. Reference numeral 124 is a power supplying roller; 124A a tension roller; 125 a power supplying roller/guide roller; 126 and 127 guide rollers; 128 a gear; 129 a bearing; 130 a rotary disk which is integrally coupled to the gear 128 by means of a coupling member 131; 132 a gear to be attached to the output shaft of the motor 166 for engagement with the gear 128; 133 a bracket to hold the auxiliary working fluid nozzle mechanism; 162 an inclinational angle controlling motor of the auxiliary working fluid nozzle; 134A a pinion gear attached to the output shaft of the motor 162; 134B a spur gear for engagement with the gear 134A; 135 a slider which is slidably supported to the bracket 133; and 136 and 137 are links coupled rotationally and mutually by means of a pin 138.

The link 136 is rotationally attached to the slider 135 and the link 137 is fixed to the spur gear 134B. Reference numeral 139 is a fixing member for coupling the working fluid nozzle 105 to the link 136, and 140 shows arrows indicating the rotating and moving directions of the working fluid nozzle 105.

In this embodiment, the working fluid nozzles 118 and 119 which are used as the main nozzles are slidably supported in the housings 116 and 117. During the spark erosion, the pressure of working fluid and the elastic forces due to the springs 118A and 119A are applied to nozzles 118 and 119, whose tips occupy a balance position softly in contact with or approaching the upper and lower surfaces of a workpiece 101, thereby producing the cylindrical jet stream which is coaxial with the wire electrode 102.

The location of the auxiliary working fluid nozzle 105 is adjusted by revolving the rotary disk 130 through the gears 132 and 128 by means of the motor 166. The angle of inclination of the nozzle 105 is adjusted by revolving the gears 134A and 134B through the links 136 and 137 by means of the motor 162. Consequently, the same action and effect as those in the embodiment shown in FIGS. 13 and 14 can be obtained.

As described above, in these embodiments, the tip of the auxiliary working fluid nozzle 105 is inserted into the slit and the numerical control program in which the necessary data has been preliminarily recorded is used to smoothly follow the trace of the wire electrode while maintaining the distance between the wire electrode and the tip of the auxiliary working fluid nozzle to be approximately 1 mm. However, it may be possible and preferable to provide a suitable or contact sensor approach on the tip of the auxiliary working fluid nozzle or its holder or the like, thereby inducing and controlling the points of the working fluid nozzle 105 so that it will not come into strong contact with the workpiece.

The angle of inclination of the auxiliary working fluid nozzle is suitably set on the basis of experience in accordance with the thickness of the workpiece and the working conditions. If the working conditions change and the working direction suddenly changes during the spark erosion, or in other cases, its inclinational angle can be appropriately changed.

Although the jet stream produced by the auxiliary working fluid nozzle is adjusted so that it generally faces the central portion of the thickness of the workpiece, when it is detected that electric discharge has occurred concentrically at a specific point of the wire electrode, its jet stream can be directed to this specific point.

Figure 16:
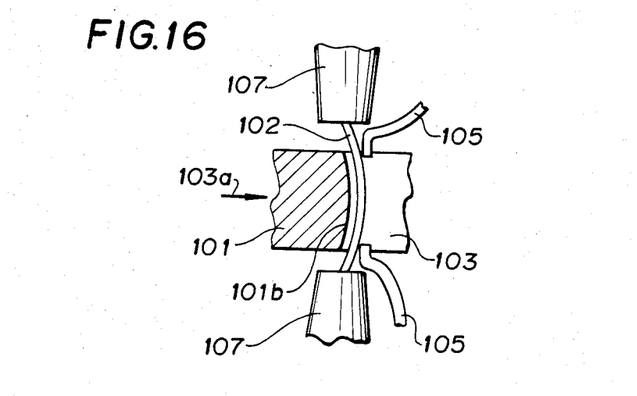
FIG. 16 is a side view with a part cut away showing an embodiment wherein the working fluid nozzles are respectively mounted at the upper and lower portions of the workpiece.

These auxiliary working fluid nozzles may be individually equipped above and below the workpiece in the same manner as the main nozzle. FIG. 16 shows such an embodiment. In this case, the fluid pressure of the main nozzle below the workpiece is set to an extent such that the jet stream in the working gap can reach almost the upper surface of the workpiece, and the fluid pressure of the auxiliary working fluid nozzle is set to be higher than that. The pressure of the lower main nozzle is set to an extent such that the jet stream to be discharged from the lower main nozzle flows together with the jet stream produced by the upper nozzle without forcibly pushing it back and mixture with air is prevented. Eventually, the pressure of the jet stream from the lower nozzle is set to a value of about 1.3 to 4 times that from the upper nozzle.

However, when the workpiece is thin, the auxiliary working fluid nozzle is disposed only below the workpiece.

Figure 17:
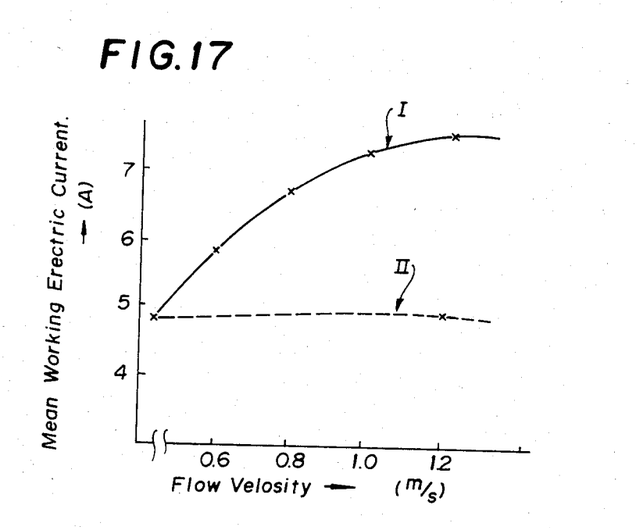
FIG. 17 is a graph showing an example of the effect according to the present invention.

The effect according to the present invention is shown in FIG. 17. In FIG. 17, curve I indicated by the solid line is a graph showing the relation between the flow velocity of the jet stream from the auxiliary working fluid nozzle and the mean working electric current when the auxiliary working fluid nozzle is used along with the main nozzle. Curve II indicated by the thin broken lines is a graph showing the relation between the flow velocity of the jet stream from the main nozzle and the mean working electric current when only the main nozzle is used without utilizing the auxiliary nozzle. This experimental example is obtained in accordance with the embodiment shown in FIG. 15; the test conditions are as follows.

| | |
|---|---|
| Wire electrode: | 6:4 brass wire having a diameter of 0.2 mm |
| Travelling velocity of the wire electrode: | About 2.5 m/min |
| Wire electrode tension: | About 1 kg |
| Workpiece: | SKD 11 having a thickness of 20 mm |
| Capacity of the power capacitor: | About 1.5 micro-F |
| No-load power voltage: | About 134 V |
| Peak working electric current: | About 15 A |
| Voltage pulse on time: | About 7 micro-sec |
| Voltage pulse off time: | About 10 micro-sec |
| Diameter of the main nozzle: | About 0.6 mm |
| Flow velocity of the jet stream from the main nozzle: | About 0.6 m/sec |
| Diameter of the auxiliary nozzle: | About 0.23 mm |

It will be appreciated in FIG. 17 that the use of the auxiliary working fluid nozzle allows the mean working electric current to increase by about 60% better than a well-known limit valve.

Although the calibers and the pressures of the upper and lower main nozzles are identical in this test, it is generally preferable that the jet pressure of the lower main nozzle be larger than that of the upper nozzle and further the jet velocity of the auxiliary working fluid nozzle is two or more times that of the main nozzle. It is also desirable, in contrast with the main nozzle, that the jet velocity of the upper auxiliary working fluid nozzle be larger than that of the lower one.

As described above, according to the present invention, the linearity of the wire electrode and the working accuracy are improved, open air will not enter the working gap, and the gases and erosion products which may be produced due to the spark erosion are further efficiently and completely removed from the working gap. Therefore, as shown in FIG. 17, the mean working electric current can be increased in response to the flow velocity of the jet stream from the auxiliary working fluid nozzle, resulting in a higher working speed in proportion to this mean working electric current.

Although preferred embodiments of the invention have been specifically illustrated and described herein, it will be appreciated that many modifications and variations of the present invention are possible in light of the above teachings and within the purview of the appended claims without departing from the spirit and intended scope of the invention.

What is claimed is:

1. A wire-cut electric discharge machine comprising a working fluid nozzle, means for passing a wire electrode through said nozzle, means for passing a working fluid through said nozzle for discharge with said wire electrode in a first flow region substantially coaxial with the wire electrode such that the wire electrode and working fluid pass through a slit being formed by spark erosion in a workpiece, means for relatively moving the workpiece and nozzle for continuous formation of said slit, the wire electrode having a front portion facing the workpiece and a back portion facing in the direction of the formed slit, means for discharging working fluid into said slit in a second flow region at the back portion of said wire electrode in an amount and pressure to produce a force at the back portion of the wire electrode which is greater than the force at the front portion of the wire electrode to resist arch-like deformation of the wire electrode and means for controlling the direction of fluid flow in said second flow region so that the working fluid thereof is maintained against the back portion of said wire electrode for all paths of relative movement between the workpiece and nozzle.

2. The machine as claimed in claim 1 wherein said working nozzle and said means for discharging working fluid in the second flow region are integrally formed as a common nozzle member having a non-circular discharge outlet, said working nozzle comprising a first portion of said common nozzle member having an outlet portion concentric with the path of travel of said wire electrode, said means for discharging working fluid in the second flow region including an auxiliary nozzle comprising a second portion of said common nozzle member having an outlet portion offset from that of said first portion.

3. The machine as claimed in claim 2 wherein said means for controlling fluid flow in said second flow region comprises means for pivoting said common nozzle member around an axis coincident with said path of travel of said wire of electrode.

4. The machine as claimed in claim 3 wherein said outlet portion of said auxiliary nozzle is elongated.

5. The machine as claimed in claim 4 wherein said outlet portion of said auxiliary nozzle tapers in narrowing direction from said outlet portion of said first portion of said working nozzle.

6. The machine as claimed in claim 3 wherein said outlet portion of said auxiliary nozzle is smaller than that of said first portion of said working nozzle 7. The machine as claimed in claim 3 wherein said outlet portion of said auxiliary nozzle comprises a plurality of small openings arranged in a linear array.

8. The machine as claimed in claim 3 wherein said second portion of said common nozzle member comprises a plurality of adjoining tubes in a linear array aligned with said first portion 9. The machine as claimed in claim 3 wherein said means for rotating said common nozzle member operates in response to the direction of advance of the workpiece.

10. The machine as claimed in claim 1 wherein said means for discharging working fluid in the second flow region comprises an auxiliary nozzle including a member having a plurality of openings arranged radially and symmetrically around a discharge opening of said working fluid nozzle, said means for controlling the fluid flow from said auxiliary nozzle comprising valve means connected to the openings of said auxiliary nozzle and means for controlling opening and closing of said valve means to control the flow of fluid from selected openings.

11. The machine as claimed in claim 1 wherein said means for discharging working fluid in said second flow region comprises an auxiliary nozzle, means supporting said auxiliary nozzle for rotation relative to said wire electrode to adjust the angle of said auxiliary nozzle with respect to said wire electrode, said auxiliary nozzle comprising a single thin nozzle member having a tip directed towards the back portion of said wire electrode, said means for controlling the fluid flow from the auxiliary nozzle controlling the position of said auxiliary nozzle relative to said wire electrode so that fluid flow from the auxiliary nozzle is always directed to the back portion of said wire electrode.

12. The machine as claimed in claim 11 wherein said auxiliary nozzle is adjustable in rotation and angle of inclination relative to said wire electrode.

13. The machine as claimed in claim 11 wherein said means for controlling the fluid flow from said auxiliary nozzle controls the rotational position and/or angle or inclination of said auxiliary nozzle in accordance with a predetermined program.

14. The improvement as claimed in claim 13 comprising sensor means associated with said auxiliary nozzle for electrically sensing the position thereof and for controlling said means which controls the position of the auxiliary nozzle.

15. A method of operating a wire-cut electric discharge machine having a working fluid nozzle, comprising passing a wire electrode through the nozzle, passing working fluid through the nozzle for discharge with the wire electrode in a first stream substantially coaxial with said wire electrode, passing the wire electrode and said working fluid through a slit being formed by spark erosion in a workpiece, relatively advancing the workpiece and the nozzle for continuous formation of said slit, the wire electrode having a front portion facing the workpiece and a back portion facing in the direction of the formed slit, discharging working fluid in a second stream into said slit to produce greater impact on the wire electrode than the working fluid in said first stream and directing said second stream against the back portion of the wire electrode to prevent arch-like deformation of the wire electrode.

16. A method as claimed in claim 15 comprising adjusting the angle of discharge of the second stream of working fluid in accordance with relative change of path of the workpiece and nozzle to maintain the second stream of working fluid against the back portion of the wire electrode.

17. A method as claimed in claim 15 wherein the working fluid in the second stream is at a greater velocity than the working fluid in the first stream.

18. A method as claimed in claim 15 wherein the working fluid in the second stream exerts a grater pressure on the back portion of the wire electrode than the working fluid on the front portion.

19. A method as claimed in claim 15 wherein the amount of working fluid flowing in the second stream is greater than that in the first stream.

* * * * *